United States Patent
Cinelli et al.

(10) Patent No.: US 11,128,620 B2
(45) Date of Patent: Sep. 21, 2021

(54) ONLINE VERIFICATION METHOD AND SYSTEM FOR VERIFYING THE IDENTITY OF A SUBJECT

(71) Applicant: Inventia S.R.L., Milan (IT)

(72) Inventors: Andrea Cinelli, Milan (IT); Antonio Minosi, Milan (IT); Alberto Garoffolo, Milan (IT)

(73) Assignee: Inventia S.R.L., Milan (IT)

( * ) Notice: Subject to any disclaimer, the term of this patent is extended or adjusted under 35 U.S.C. 154(b) by 177 days.

(21) Appl. No.: 16/500,405

(22) PCT Filed: Apr. 3, 2018

(86) PCT No.: PCT/IB2018/052282
§ 371 (c)(1),
(2) Date: Oct. 3, 2019

(87) PCT Pub. No.: WO2018/185649
PCT Pub. Date: Oct. 11, 2018

(65) Prior Publication Data
US 2020/0120091 A1    Apr. 16, 2020

(30) Foreign Application Priority Data
Apr. 4, 2017  (IT) .................. 102017000036968

(51) Int. Cl.
*H04L 29/06*      (2006.01)
*H04L 9/08*       (2006.01)
(Continued)

(52) U.S. Cl.
CPC ........ *H04L 63/0861* (2013.01); *H04L 9/0869* (2013.01); *H04L 41/22* (2013.01);
(Continued)

(58) Field of Classification Search
CPC ... H04L 63/0861; H04L 9/0869; H04L 41/22; H04L 63/0838; H04L 63/1483; H04W 12/068
See application file for complete search history.

(56) References Cited

U.S. PATENT DOCUMENTS

| 10,341,310 B1 * | 7/2019 | Leon ................. H04L 9/3231 |
| 2013/0219480 A1 * | 8/2013 | Bud .................... G06F 21/32 726/7 |
| 2015/0281231 A1 | 10/2015 | Ganesan |

FOREIGN PATENT DOCUMENTS

| DE | 102013100635 | 7/2014 |
| WO | WO 2018/185649 | 10/2018 |

OTHER PUBLICATIONS

International Search Report and the Written Opinion dated Jul. 5, 2018 From the International Searching Authority Re. Application No. PCT/IB2018/052282. (10 Pages).

* cited by examiner

*Primary Examiner* — Huan V Doan (57) ABSTRACT

An online verification method is described for verifying the identity of a subject comprising the steps of generating a random code associated with a subject to be identified; sending the random code to the mobile electronic device of the subject to be identified; receiving the random code on the mobile electronic device of the subject; acquiring by means of the at least one electronic image acquisition device of the mobile electronic device at least one first image representing the subject; processing in a single composite screen page comprising at least two images, the at least one first image representing the subject and a second image representing the random code.
The invention further describes an online verification system for verifying the identity of a subject.

13 Claims, 4 Drawing Sheets

(51) Int. Cl.
*H04L 12/24* (2006.01)
*H04W 12/06* (2021.01)
(52) U.S. Cl.
CPC ...... *H04L 63/0838* (2013.01); *H04L 63/1483* (2013.01); *H04W 12/068* (2021.01)

ONLINE VERIFICATION METHOD AND SYSTEM FOR VERIFYING THE IDENTITY OF A SUBJECT

RELATED APPLICATIONS

This application is a National Phase of PCT Patent Application No. PCT/162018/052282 having International filing date of Apr. 3, 2018, which claims the benefit of priority of Italian Patent Application No. 102017000036968 filed on Apr. 4, 2017. The contents of the above applications are all incorporated by reference as if fully set forth herein in their entirety.

FIELD AND BACKGROUND OF THE INVENTION

The present invention relates to an online verification method and system for verifying the identity of a subject.

In particular, the present invention relates to an online verification method and system for verifying the identity of a subject through a mobile electronic device in a digital identification procedure.

As is known, the digital identity is the set of information and resources given by an information system to a particular user of the aforementioned system under an identification procedure. In a wider meaning it comprises the set of information present online and relative to a user, a body, or the like.

Digital identity therefore means a set of credentials, username and password, that are associated with a physical person or company to establish an actual virtual recognition electronic document.

A digital identity more simply consists of a username and a secret identification word (or password). In this case the username is the identity, while the password is called the authentication credential.

In transactions, when it is proven that the digital identity is effectively that of whoever or whatever says it is, we talk about the authentication process.

Authentication with only one factor (i.e. with a username and password) is not very secure because the password could be identified by someone who is not the real user. Multi-factor authentication may be more secure, e.g. with a physical security key, magnetic card, smart card and a password. If biometric information is added (iris, fingerprint, voiceprint, face recognition, etc.) we have more robust authentication factors.

New identification and authentication procedures have been continuously developed, that replace and/or support classic passwords that can be poor in terms of security.

The generation and sending of passwords only generated once (OTP, "One Time Password") for the subject is also known in identification and authentication procedures. Such OTP passwords are valid for one access session or a single transaction only.

In some known identification procedures, files may be requested containing copies of personal documents such as ID cards, passports or healthcare cards to verify the real identity of the subject during the authentication step.

An authentication process of a subject is also known which allows a digital identity to be authenticated, adapted to operate with any body or subject of the Italian Public Administration through a single digital identity (username and password), through the use of computers, smartphones and/or tablets.

This known process requires authentication through an operator of an accredited identity service provider. In particular, in the online recognition situation, the subject must exhibit simultaneously to the capturing device an image of the subject him/herself and of an SMS ("Short Message Service"), containing an OTP code ("One Time Password"), previously sent by the operator to the mobile electronic device, so that the operator of the identity service provider is able to correctly verify the identity of the subject requesting the digital identity and the simultaneous possession of the mobile electronic device used for receiving the OTP code.

Such procedure is possible when the subject is in front of a PC provided with a camera adapted for the simultaneous capturing of the subject and of a mobile electronic device in his/her possession that displays the SMS containing the OTP code just received on its display.

Such procedure is not possible if the subject is only in possession of the mobile electronic device, as with such device it would not be possible to simultaneously capture the face of the subject and the SMS containing the OTP code.

Therefore, a need is felt for a verification procedure that envisages showing and simultaneously acquiring the image of the requesting subject and an OTP code received on the mobile electronic device of the subject, through the use of the mobile electronic device only.

SUMMARY OF THE INVENTION

The object of the present invention is that of providing an online verification method and system for verifying the identity of a subject that allows identification should the subject be in possession of the mobile electronic device only.

Another object of the present invention is that of providing an online verification method and system for verifying the identity of a subject through the use of a mobile electronic device that can guarantee a high level of security.

A further object of the present invention is that of providing an online verification method and system for verifying the identity of a subject that is quick and efficient.

A further and not least object of the present invention is that of providing an online verification method and system for verifying the identity of a subject that is highly reliable, easy to realise and simple to use.

These and other objects are achieved by an online identification method for identifying a subject as described in claims 1, 3 to 12.

These and other objects are also achieved by an online identification system for identifying a subject as described in claim 13.

The invention also finally provides a computer program which actuates one or more of the steps of the method, as described in claim 13.

In a first aspect, the invention describes an online verification method for verifying the identity of a subject comprising the steps of generating a random code associated with a subject to be identified; sending the random code to the mobile electronic device of the subject to be identified; receiving the random code on the mobile electronic device of the subject; acquiring by means of the at least one electronic image acquisition device of the mobile electronic device at least one first image representing the subject; processing in a single composite screen page comprising at least two images, the at least one first image representing the subject and a second image representing the random code.

In a second aspect the invention describes an online verification system for verifying the identity of a subject comprising:
 a module configured to generate a random code;
 means suitable for sending the random code to the mobile electronic device of the subject;
 a processing unit that is in data communication with the subject to be identified, the remote operator and the module configured to generate and send the random code, said processing unit comprising:
  a first acquisition module configured to acquire at least one first image representing the subject from the electronic image acquisition device;
  a second acquisition module configured to generate a second image representing the random code received by the mobile electronic device;
  an image-processing module configured to process in a single composite screen page comprising at least two images, the at least one first image representing the subject and the second image representing the random code.

In a third aspect, the invention describes a computer program, which, when running on a computer, implements at least one or more steps of the method according to the first aspect of the invention.

The invention achieves the following technical effects:
 it allows the identity of a subject to be performed and verified online, preferably validated by a remote operator, using only the mobile electronic device in the possession of the subject to be identified;
 it allows an image of the subject, captured by the mobile electronic device in real time, to be shown in audio and video connection to the remote operator, at the same time as a random code received on the mobile electronic device;
 it allows an efficient and secure online verification of the identity of a subject;
 it allows an online verification of the identity of a subject which is flexible in use by the operator;
 it allows an online verification of the identity of a subject which is quick and low cost.

Further characteristics and advantages of the invention will more fully emerge from the description of a preferred but not exclusive embodiment of an online method and verification system for verifying the identity of a subject according to the invention, illustrated by way of indicative and non-limiting example with reference to the accompanying drawings.

BRIEF DESCRIPTION OF THE SEVERAL VIEWS OF THE DRAWINGS

The description is provided below with reference to the accompanying figures, whose purpose is likewise purely illustrative and hence non-limiting, in which.

DESCRIPTION OF SPECIFIC EMBODIMENTS OF THE INVENTION

Figure 1:
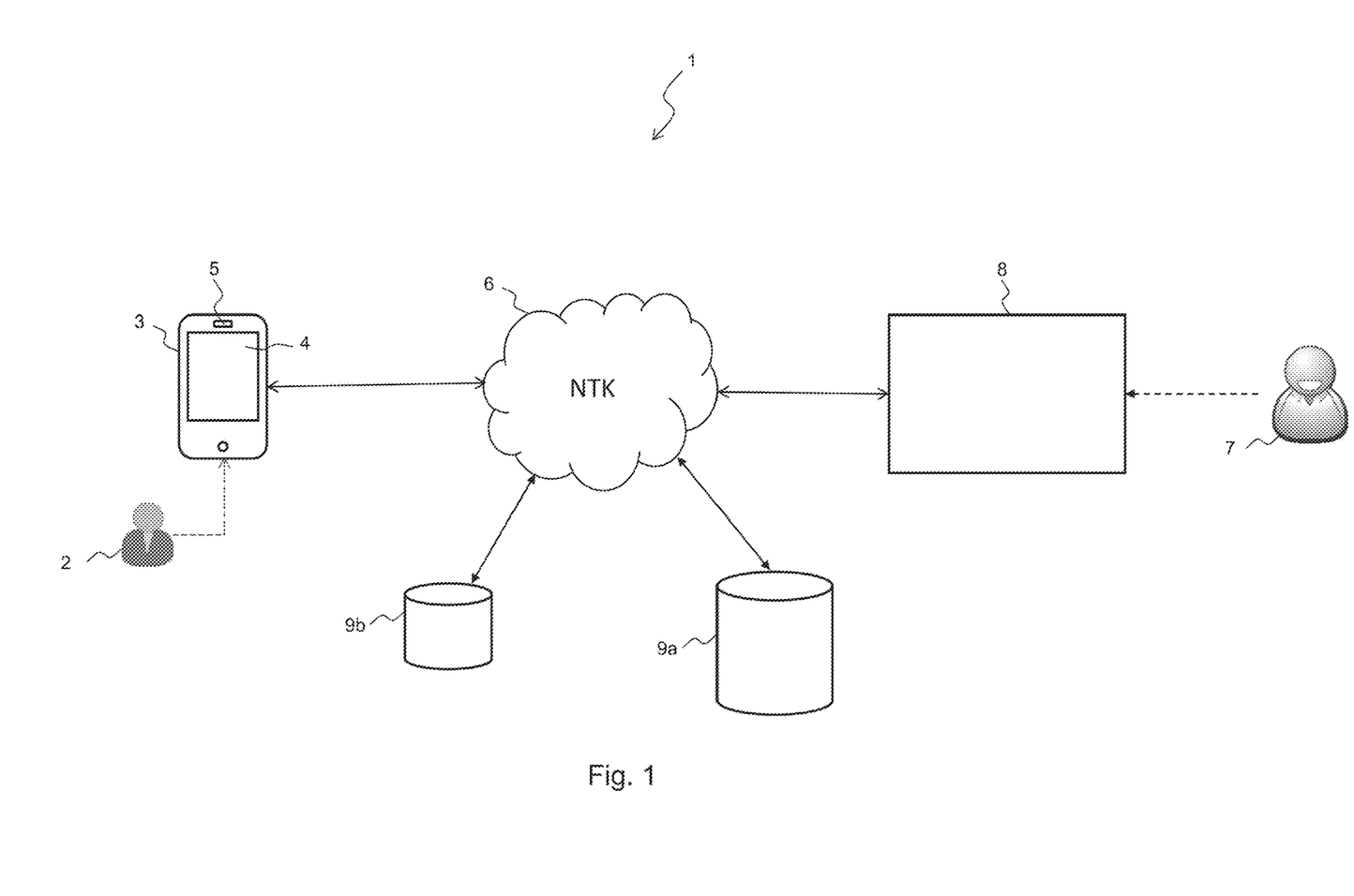
FIG. 1 illustrates a general functional block diagram related to a possible architecture of the system according to the invention.

With reference to the cited figures, the online verification system for verifying the identity of a subject according to the invention is indicated overall with the reference number 1 in the block diagram of FIG. 1.

FIG. 1 illustrates a subject 2 to be identified equipped with a mobile electronic device 3 and a remote operator 7 equipped with an electronic device 8.

The remote operator 7 is preferably an operator qualified to recognise the identity of a subject and to register him/her.

The mobile electronic device 3 of the subject 2 to be identified and the electronic device 8 of the remote operator 7 are provided with interfaces that allow them to communicate with each other through a telematic communication network 6.

The telematic network 6 is preferably the internet but could also be an intranet network or any private network adapted to implement a client-server type communication protocol. The telematic network 6 is connected, where necessary, to mobile networks for communication between the remote operator 7 and the subject 2.

The mobile electronic device 3 comprises a display 4 adapted to display alphanumerical characters, images and videos and at least one electronic image acquisition device 5 adapted to acquire images and/or videos. The mobile electronic device 3 is configured to enable the subjects 2 to be identified to receive communications according to at least two distinct channels: in a preferred embodiment these channels are email and/or SMS messages. Furthermore, the mobile electronic device 3 allows the subject 2 to be identified to be connected in real time in audio and video connection with the remote operator 7.

The electronic device 8 of the remote operator 7 comprises a means for communicating in real time through an audio and video connection with the subject 2 to be identified according to a plurality of channels, in particular, in a preferred embodiment, in the form of text messages. The text messages can preferably be emails and/or text chat messages.

Preferably, the audio and video connection is a video conference connection, e.g. through an instant messaging service such as, for example, Skype, Hangouts, Messenger or the like.

The electronic device 8 of the remote operator 7 is also provided with a display and at least one electronic image acquisition device (not shown in the appended figures) adapted to acquire images and/or videos, so as to be able to make a video conference connection with a subject 2.

Preferably, the mobile electronic device 3 of the subject 2 to be identified and the electronic device 8 of the remote operator 7 are in data connection with an Application Server 9a, also provided with an interface that allows them to communicate through a telematic communication network 6.

Figure 2:
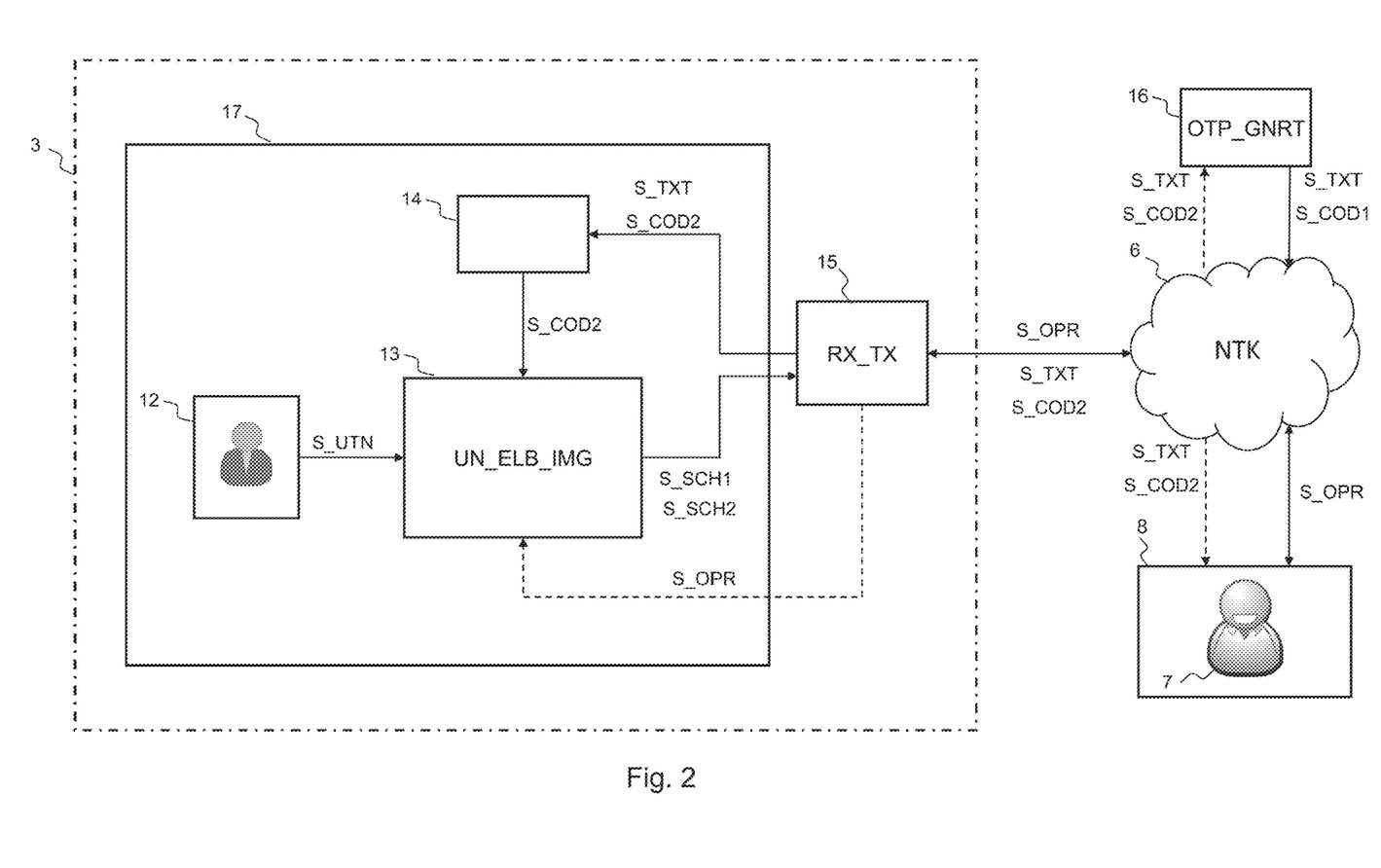
FIG. 2 is a block diagram that illustrates in more detail an aspect of the architecture of FIG. 1.

As illustrated in FIG. 2, the system comprises a module 16 configured to generate a random code S_COD1 and means suitable for sending the random code S_COD1 to the mobile electronic device 3 of the subject 2 to be identified through a telematic network 6.

The random code S_COD1 is generated for a limited time period and is only valid for a single access session or identity verification.

Alternatively, a remote server 9b, connected through the telematic network 6, contains the module 16 configured to generate the random code S_COD1 and is managed by a third party.

The system 1 also comprises a processing unit 17 in data communication with the subject to be identified 2 and the module 16 configured to generate and send the random code S_COD1.

The processing unit 17 comprises:
- a first acquisition module 12 configured to acquire at least one first image 11a representing the subject 2 from the electronic image acquisition device 5;
- an acquisition module 14 configured to generate a second image 11b representing the random code S_COD2 received by the mobile electronic device 3;
- an image-processing module 13 configured to process in a single composite screen page 10, comprising at least two images, the at least one first image 11a representing the subject 2 and the second image 11b representing the random code S_COD2.

Preferably, the at least one first image 11a representing the subject 2 could comprise two or more images of the subject in different positions such as, for example, a front image and a profile image.

Preferably, the random code S_COD1 can be generated through an algorithm based on coordinated timing between the authentication server and client that provides the random code (OTPs are only valid for a short period of time), or through a mathematical algorithm that generates a new random code based on the previous code (in fact, the codes are a chain of interconnected codes, and must be used in a predefined order) or through a mathematical algorithm where the random code is based on a challenge (e.g. a random number selected by the authentication server or from the transaction details) and/or on a counter.

Preferably, the system 1 according to the present invention comprises a means adapted to create a video conference connection between the subject to be identified 2 and the remote operator 7.

In the embodiment of FIG. 2, the processing unit 17 is illustrated inside the mobile electronic device 3 of the subject 2 to be identified. However, the processing unit 17 could be located inside the electronic device 8 of the remote operator 7 or inside the server 9a.

In general, it should be noted that in the present context and in the subsequent claims, the processing unit 17 is considered to be split into distinct functional modules (storage modules or operating modules) for the sole purpose of describing its functionalities clearly and completely.

Such processing unit can comprise a single electronic device, appropriately programmed to perform the functionalities described, and the different modules can correspond to hardware entities and/or routine software that are part of the programmed device.

Alternatively or additionally, such functions may be performed by a plurality of electronic devices over which the aforesaid functional modules can be distributed.

The processing unit 17 can also make use of one or more processors for executing the instructions contained in the storage modules.

The aforementioned functional modules can also be distributed on different local or remote computers, depending on the architecture of the network in which they reside.

The processing unit 17 is in data communication with the subject to be identified 2, with the electronic device 8 of the remote operator 7, with the module 16 configured to generate a random code and with the means adapted to send the random code.

Figure 3:
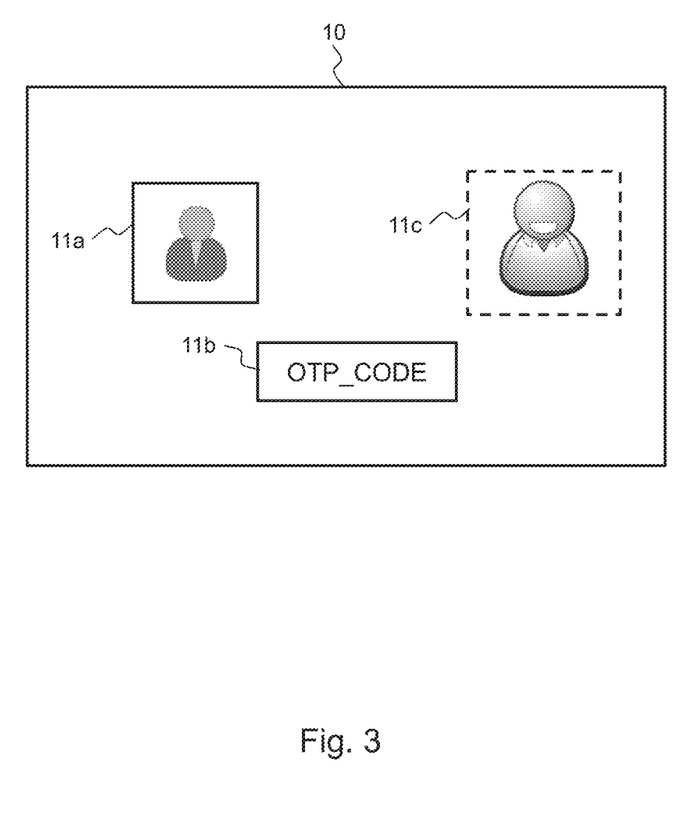
FIG. 3 shows a graph of the system/method according to the invention.
Figure 4:
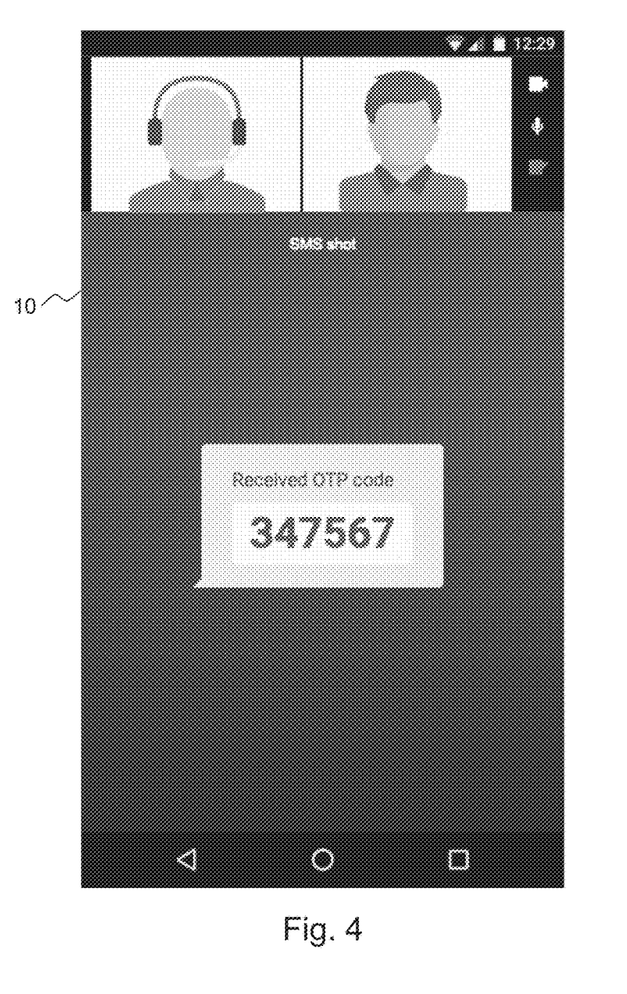
FIG. 4 shows a screen page of the mobile electronic device of the subject to be identified according to an embodiment of the invention.

The processing unit 17 comprises a first acquisition module 12 configured to acquire at least one first image 11a representing the subject 2 from the electronic image acquisition device 5, a second acquisition module 14 configured to generate a second image 11b representing the random code S_COD2 received by the mobile electronic device 3 and an image-processing module 13 configured to process in a single composite screen page 10 comprising at least two images, as illustrated in FIG. 3. The at least two images of the composite screen page 10 comprise the at least one first image 11a representing the subject 2 to be identified and the second image 11b representing the random code S_COD2 received on the mobile electronic device.

Preferably, the system 1 comprises a third acquisition module for acquiring a third image 11c representing a remote operator 7 equipped with an electronic device 8, equipped with at least one camera and audio devices (at least one loudspeaker and a microphone), in audio and video connection with the subject 2 to be identified.

Preferably, the remote operator 7 performs the identification process of the subject 2 in real time.

The image processing module 13 is further configured to process in a single composite screen page 10 the at least one first image 11a representing the subject 2, the second image 11b representing the random code S_COD2 and the third image 11c representing the remote operator 7.

The acquisition of the image 11c representing the remote operator 7 preferably takes place through an electronic image acquisition device present in the electronic device 8.

The image processing module 13 is preferably configured to process in a single composite screen page 10 the at least one first image 11a representing the subject 2, the second image 11b representing the random code S_COD2 and a third image 11c representing the remote operator 7, as illustrated in FIG. 3.

Contextually, the image of the composite screen page 10 is transmitted to the Application Server 9a and/or to the electronic device 8 of the remote operator 7. Preferably, the random code S_COD1 associated with the subject 2 to be identified, is sent to the subject 2 within a text message S_TXT, as a signal S_COD1.

Preferably, the module 14 detects the random code S_COD2 contained in the body of the text message S_TXT and enters it in a specific field found in a graphical interface represented on the mobile electronic device 3 of the subject 2.

Optionally, the random code S_COD2 is sent by the module 15 present on the mobile electronic device 3 of the subject 2 also to the electronic device 8 of the remote operator 7 and entered in a specific field found in the remote operator side graphical interface 7.

Preferably, the system comprises a module able to recognise the operating system of the mobile electronic device 3 of the subject 2. For example, the recognition module of the operating system is able to detect whether the operating system is Android or IOS or Microsoft Mobile or others.

In the event that the operating system recognised is Android, the module 16 generates and sends a text message S_TXT containing the random code S_COD1 within the body of the message.

In that case, the random code S_COD2 received by the subject 2 to be identified is recognised by the acquisition module 14 and displayed in the relevant field of the graphical interface of the mobile electronic device 3 of the subject 2.

In the event that the operating system recognised is IOS by Apple, the module 16 generates a text message S_TXT containing a hypertext link in the body of the message.

In that case, the random code S_COD2 is displayed by the acquisition module 14, in the relevant field of the graphical interface of the mobile electronic device 3 of the subject 2 by means of the selection (clicking) of the hypertext link contained within the body of the text message S_TXT, without any manual intervention by the operator.

In both the situations described above, any possible typing errors in the event that the subject had to copy or dictate the random code S_COD2 received can be avoided and the identity verification procedure is quicker.

Preferably, the random code S_COD2 is automatically displayed in the relevant field of the graphical interface represented in the electronic device 8 of the remote operator 7.

Preferably, the random code S_COD1 is automatically generated by an Application Server 9a. Optionally, the remote server 9b is part of a third party responsible for generating and sending random codes S_COD1.

Preferably, the random code S_COD1 associated with the subject 2 to be identified has a time duration and is different at each request for the online verification of the identity of the subject 2. In particular, the random code S_COD1 is a "One-Time Password" which is only valid for the single identification session or verification.

Preferably, the server 9a or 9b that generated the code S_COD1 performs a verification between the random code S_COD2 displayed in the relevant field of the graphical interface of the mobile electronic device 3 of the subject 2 and the random code S_COD1 generated, optionally following the express command of the remote operator 7.

In the event that the two random codes S_COD1; S_COD2 coincide, the composite screen page 10, displayed on the mobile electronic device 3, comprising the at least two images 11a and 11b, is captured. Preferably the capture of the composite screen page 10 can take place following the express command of the remote operator 7.

Advantageously, the online verification system 1 for verifying the identity of a subject according to the invention can comprise a facial recognition method and system for recognising the remote user to be identified. In that case, the system exploits the electronic image acquisition device 5 of the mobile electronic device 3 to acquire in real time a plurality of images representing the face of the subject to be identified, through the movement of the head of the subject in different positions starting from an initial position. The acquisition module 12, of the processing unit 13, is therefore configured to receive a plurality of acquired images (of the subject to be identified), configured to process the plurality of acquired images and to measure, according to them, at least one biometric parameter of the face of the person associated with said different head positions, obtaining a plurality of measurements of the biometric parameters of the face, configured to verify whether the variations of the values of at least part of said plurality of measurements of at least one biometric parameter associated with the head movement are compatible with each other, and configured to generate a positive or negative outcome signal of the recognition of the face in real time, in the event of said respectively positive or negative verification of the compatibility of the measurements of the at least one biometric parameter. Furthermore, said acquisition module 12 configured to recognise the face, can comprise performing a comparison between one or more images captured in real time by the mobile electronic device 3 of the subject to be identified and an image acquired of the user (e.g. from an identity document, passport, driving licence or the like), in order to verify with precision whether the images captured in real time of the subject to be identified represent the face of the same user represented in the acquired image.

Advantageously, some or all of the subject identification steps can be performed automatically, without the intervention of a remote operator, by means of performing a process performed by the processing unit and possibly with the support of a chatbot that provides text instructions by means of an online chat (referred to as "automa").

The streaming video (sequence of individual images) of the subject to be identified during all the recognition steps of the subject captured by the electronic image acquisition device 5 are displayed on the display 4 of the mobile electronic device 3 while the subject communicates (by looking at the display 4) with the remote operator or with the automa. In a preferred but not limiting embodiment of the invention, the first acquisition module 12 is configured to acquire at least one frame (i.e. single image) of the streaming video displayed by the subject on his/her display 4; the frame acquired thus constitutes the at least one first image 11a that represents the subject 2 to be identified.

Preferably, the image 11a that represents the subject 2 to be identified is a frame of the streaming video provided on the application server 9a and captured in real time.

The composite screen page 10 comprising the at least two images 11a; 11b is memorised in a server provided with a memory. In particular, the server provided with a memory preferably coincides with the Application Server 9a.

Preferably, the online verification system and method for verifying the identity of a subject, described above, is placed within an online identification procedure for identifying the identity of the same subject.

Once the online audio and video connection between the electronic device 8 of the remote operator 7 and the mobile electronic device 3 of the subject 2 to be identified has been performed, some preliminary operations can be performed. For example, a request for the personal data of the subject 2, warnings and disclaimers of the remote operator 7 to the subject 2, a request for the identity document and tax code, compilation of data by the remote operator. After the operator has compiled the subject's data, a screen page can preferably be proposed again summarising the data entered with a request for approval by the subject. The remote operator can verify the existence of the natural person by connecting for example to the revenue agency's portal and/or to the website of the Ministry of the Interior. Consent may also be requested for the recording of the audio/video session for subsequent storage thereof. Following the aforementioned preliminary operations, the audio and video session with the qualified remote operator is started.

In particular, the invention is also related to an online verification method for verifying the identity of a subject comprising the steps of:
 a) generating a random code S_COD1 associated with a subject 2 to be identified;
 b) sending the random code S_COD1 to the mobile electronic device 3 of the subject 2 to be identified;
 c) receiving the random code S_COD2 on the mobile electronic device 3 of the subject 2;
 d) acquiring through the at least one electronic image acquisition device 5 of the mobile electronic device 3, at least a first image 11a representing the subject 2;

e) processing in a single composite screen page 10, comprising at least two images, the at least first image 11a representing the subject 2 and a second image 11b representing the random code S_COD2.

The invention claimed is:

1. An online verification method for verifying the identity of a subject, comprising the steps of:
   a) generating a random code associated with the subject to be identified;
   b) sending the random code to the mobile electronic device of the subject to be identified;
   c) receiving the random code on the mobile electronic device of the subject;
   d) acquiring, by means of the at least one electronic image acquisition device of the mobile electronic device, at least one first image representing the subject;
   e) acquiring a third image representing a remote operator equipped with an electronic device in audio and video connection with the subject to be identified; and
   (f) processing, in a single composite screen page comprising at least three images, the at least one first image representing the subject, a second image representing the random code and the third image representing the remote operator.

2. The online verification method according to claim 1, wherein the random code associated with the subject is sent to the subject within a text message.

3. The online verification method according to claim 2, comprising the step of detecting the random code in the body of the text message and entering it in a specific field found in a graphical interface represented on the mobile electronic device of the subject.

4. The online verification method according to claim 3, wherein the random code is displayed in the specific field in the graphical interface of the mobile electronic device of the subject by means of the selection of a hypertext link contained in the body of the text message.

5. The online verification method according to claim 3, wherein the random code is automatically copied in the specific field in the graphical interface represented on the electronic device of the remote operator.

6. The online verification method according to claim 1, comprising a step of recognizing the operating system of the mobile electronic device of the subject.

7. The online verification method according to claim 1, wherein the random code is automatically generated by an application server.

8. The online verification method according to claim 1, wherein the random code associated with a subject to be identified is temporary and differs with each request for online verification of the identity of the subject.

9. The online verification method according to claim 1, wherein, in a server a check is made between random code displayed in the specific field in the graphical interface of the mobile electronic device of the subject and the random code generated by the server.

10. The online verification method according to claim 9, wherein if the random codes cited above match, the composite screen page comprising the at least two images is captured.

11. The online verification method according to claim 10, wherein the composite screen page comprising the at least two images is stored in a remote server provided with a memory.

12. An online verification system for verifying the identity of a subject, comprising:
    a first engine configured to generate a random code;
    a second engine for sending the random code to the mobile electronic device of the subject; and
    a processing unit that is in data communication with the subject to be identified, a remote operator and the first engine configured to generate and send the random code, the processing unit comprising:
      a first acquisition module configured to acquire at least one first image representing the subject from an electronic image acquisition device;
      a second acquisition module configured to generate a second image representing the random code received from the mobile electronic device;
      a third acquisition module for acquiring a third image representing a remote operator equipped with an electronic device in audio and video connection with the subject to be identified; and
      an image-processing module configured to process, in a single composite screen page comprising at least three images, the at least one first image representing the subject, the second image representing the random code and the third image representing the remote operator.

13. A non-transitory computer-readable storage medium storing a computer program, which, when running on a computer, implements the steps of:
    generating a random code associated with a subject to be identified;
    sending the random code to the mobile electronic device of the subject to be identified;
    receiving the random code on the mobile electronic device of the subject;
    acquiring, by means of the at least one electronic image acquisition device of the mobile electronic device, at least one first image representing the subject;
    acquiring a third image representing a remote operator equipped with an electronic device in audio and video connection with the subject to be identified; and
    processing, in a single composite screen page comprising at least three images, the at least one first image representing the subject, a second image representing the random code and the third image representing the remote operator.

* * * * *